United States Patent [19]

Roberg

[11] Patent Number: 4,958,450
[45] Date of Patent: Sep. 25, 1990

[54] PROTECTIVE HOLDER FOR HOLDING THIN OR SUBSTANTIALLY THIN ITEMS

[76] Inventor: Paul J. Roberg, 51 Surrey La., Tenafly, N.J. 07670

[21] Appl. No.: 246,699

[22] Filed: Sep. 20, 1988

[51] Int. Cl.$^5$ .............................................. B65D 27/22
[52] U.S. Cl. ..................................... 40/159; 40/159.2; 206/456
[58] Field of Search ...................... 40/152, 158.1, 159, 40/159.2; 206/455, 456

[56] References Cited

U.S. PATENT DOCUMENTS

| 3,245,166 | 4/1966 | Hagner | 40/159 |
| 3,685,187 | 8/1972 | Hillmer | 40/159 |
| 3,816,948 | 6/1974 | Mooney et al. | 40/159 X |
| 4,173,837 | 11/1979 | Kiejzik | 40/159 |
| 4,508,224 | 4/1985 | Weber et al. | 206/455 |
| 4,533,048 | 8/1985 | Ozeki | 206/455 |

Primary Examiner—Richard J. Apley
Assistant Examiner—D. F. Crosby
Attorney, Agent, or Firm—McGlew & Tuttle

[57] ABSTRACT

A holder for thin items including a backing sheet and a plurality of strips. The plurality of strips include several standard strips having a width equal to the width of the backing sheet and a top strip and a bottom strip having a width equal to the backing sheet and having a length smaller than the standard strips. Each of the strips is connected to a backing sheet along a longitudinal line running along the length of the backing sheet. Each of the longitudinal connecting lines is parallel to a longitudinal connecting line of an adjacent strip. Transverse connecting lines connect each of the strips except for the top strip to the backing sheet. Transverse connecting lines extend from an associated longitudinal connecting line toward an upper edge of each of the strips. The transverse connecting lines terminate a distance before the upper edge of the strip so as to provide an upper overlap portion. At least the standard strips and the upper strip are connected to the backing sheet by a longitudinal connection line which is spaced from the lower edge of the associated strip so as to provide a lower overlap portion.

2 Claims, 2 Drawing Sheets

PROTECTIVE HOLDER FOR HOLDING THIN OR SUBSTANTIALLY THIN ITEMS

FIELD OF THE INVENTION

This invention relates in general to flexible holder sheets for holding thin or substantially thin items to be stored and protected, and/or displayed, such as photographic slides, prints or negatives, baseball cards, stamps, coins business cards, and the like, in general, and in particular to a new and useful holder of thin items to be stored and protected, and/or displayed, wherein the thin items can be readily inserted for storage, viewing and/or transporting, and will be retrained from being inadvertently dislodged from the holders, but readily removed when desired.

BACKGROUND OF THE INVENTION

Flexible holder sheets are known such as Ozeki, U.S. Pat. No. 4,533,048 and others. However, these are cumbersome to load, allow introduction of dust or moisture, and may allow inadvertent dislodgement of the contents.

The present invention provides pockets with shallow side walls so that the material above the walls acts as a flap and in cooperation with a like oppositely functioning flap from above can function advantageously as a loading guide, a dust and moisture guard, and a security flap.

SUMMARY OF THE INVENTION

The invention provides a holder for thin items to be stored and/or displayed and protected which comprises a flexible backing sheet on which are fastened two or more parallel front strips with at least one overlapping region. The front strips are each sealed once to the backing sheet along a longitudinal axis of the front strips and at least twice along a transverse axis of the front strips. The top front strip, however, has only a longitudinal seal. The longitudinal seals may be continuous or discontinuous. The transverse seals are spaced apart and parallel, and are perpendicular to, and intersect or nearly intersect the longitudinal seals.

The arrangement of the front strip, or strips, each sealed once longitudinally and at least twice transversely to the backing sheet, form at least one pocket into which are inserted the thin items to be stored and protected.

In accordance with the invention the longitudinal seals may seal the front strips to the backing sheet along the entire length. In the preferred embodiment, the strips, are arranged so that a strip-bottom flap, below the strip longitudinal seal underlies the pocket of the strip blow. The transverse seals run from the longitudinal seal toward the top of the backing sheet but not to the top edge of the individual strip. The transverse seal top edge defining a lower edge of a strip-top flap. The strip-top flap overlaps or underlaps the top front strip which is in the topmost overlap region. By providing a plurality of top strips with lateral seals each strip-bottom flap will overlap or underlap the strip-top flap of the strip immediately below it in the respective overlap region. The bottom-most strip with one or more pockets has no strip-bottom flap because there is no overlap region below the bottom-most pocket or pockets.

In accordance with the invention the top strip flap or the strip-bottom flap or flaps, interact with the strip-top flap or flaps, to achieve three distinctly different functional positions. These positions are: the item loading position, in which the top strip flap or the strip-bottom flap underlies the strip-top flap of the strip below it in the overlap region; the protection position, in which the top strip flap or the strip-bottom flap, or flaps, overlies both the inserted item and the strip-top flap in the overlapping region; and the locking position in which the top strip flap or the strip-bottom flap, or flaps, underlies the strip-top flap, or flaps, and overlaps the inserted item, in the overlap region.

The holder may be in the form of pages which can in turn be provided with a means for filing in a ring binder or a hanging file. It is important in keeping with the invention that the transverse seals along the sides of the pages do not extend any higher than the transverse seals within the interior of the page, therefore not disrupting the function of the flap or flaps.

If the holder is to be made to accommodate a thin hanging bar to facilitate hanging in a hanging file then an additional longitudinal seal is made at a distance from the topmost longitudinal seal in the top front strip to allow the insertion of the hanging bar. According to an embodiment of the invention, the transverse weight of the page should be such as to allow for the double sealing in the top strip without interfering with the function of the flaps.

In a further embodiment, with holes allowing for storage of the holder in a ring binder, additional transverse seals should be made parallel to the edge seals at a distance allowing for holes into which are inserted the rings of a ring binder and the like with enough material to maintain the structural integrity of the page. Accordingly, the page must be of extended width to allow for the material to receive the holes.

The holder can be made of any flexible durable sealable material preferably of the archival type. The materials may include; polypropylene, polyethylene, polyester, triacetate, polyvinylchloride, or paper and the like. The material may be transparent, translucent, or opaque. The transparent materials preferably of goods optical clarity.

The sealing may include heat sealing, ultrasonic, radio frequency, adhesive sealing, mechanical sealing or any other appropriate means for sealing.

OBJECTS OF THE INVENTION

It is an object of the invention to provide a protective storage holding device for thin items such as photographic slides, photographic prints, coins, baseball cards, and the like, which allows for rapid and easy insertion and removal of the items into and from the holder, while reducing the manual dexterity demands of the item loader.

It is another object of the invention to provide an easily achieved intermediate functional position which includes a high level of dust protection and a reasonably high level of protection against dislodgement while still allowing for rapid interchangeability of the inserted items for desired ordering of items.

It is a further object of the invention to provide a locking functional position which includes a high level of dust protection and a very high level of protection against dislodgement.

It is a still further object of the invention to provide a holder of convenient dimensions to allow for the possible placement of the holder in a ring binder or hanging file.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

GENERAL DESCRIPTION OF THE PREFERRED EMBODIMENTS

Figure 1:
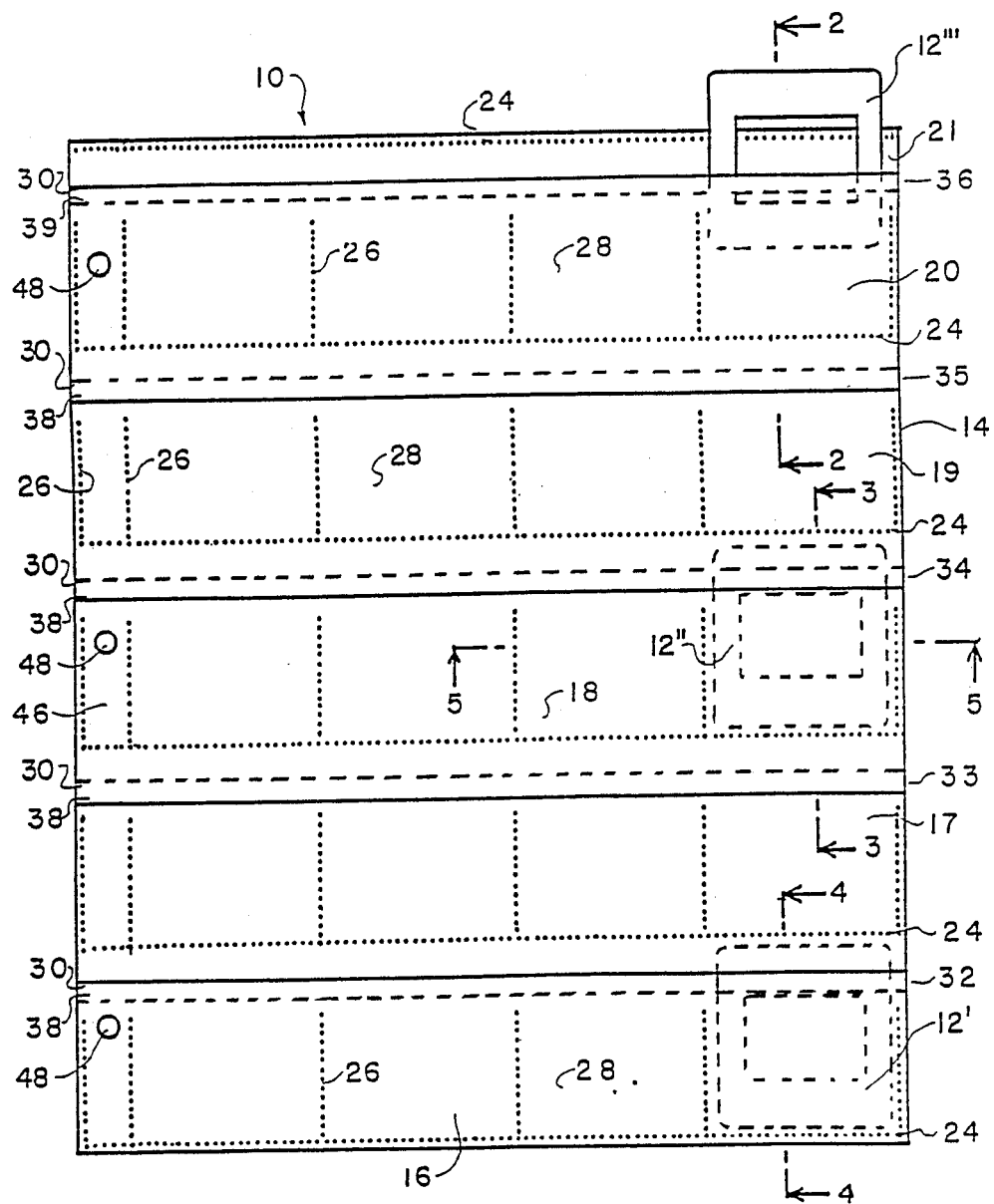
FIG. 1 is an elevational view of one embodiment of the invention which shows a page size holder for photographic slides.

Referring to the drawings in particular where like numerals indicate like parts, FIG. 1 shows a holder page 10 for holding, protecting, and storing photographic slides, generally numbered 12, between a backing sheet 14 and a plurality of front strips, 16, 17, 18 19, 20 and 21. The front strips being sealed to the backing sheet at longitudinal connection lines or longitudinal seals 24 and transverse connection lines or transverse seals 26 providing pockets generally numbered 28, in which are inserted the slides 12.

Figure 2:
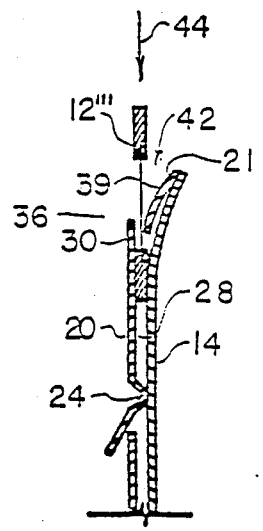
FIG. 2 is a vertical cross-sectional view of the holder shown in FIG. 1, taken along the line II—II.
Figure 3:
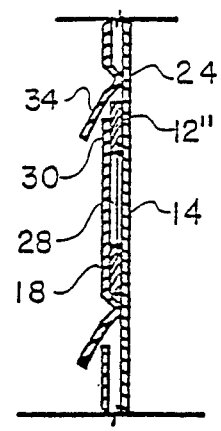
FIG. 3 is a vertical cross-sectional view of the holder shown in FIG. 1, taken along the line III—III.
Figure 4:
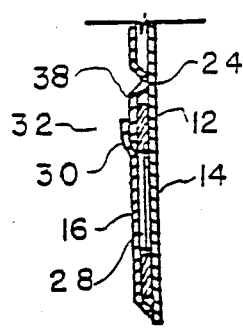
FIG. 4 is a vertical cross-sectional view of the holder shown in FIG. 1, taken along the line IV—IV.

Three functional positions of the flaps; the loading position, the protection position, and the locking position, are shown in overlap regions 36, 34 and 32 respectively in FIG. 1, and again respectively in FIGS. 2, 3 and 4.

The bottom front strip 16 is sealed to the backing sheets along one longitudinal edge at longitudinal seal 24. The transverse seals 26 stop at a distance before the top edge; i.e. about 12 mm, of the strip 16, thus creating a pocket-top flap 30 in the bottommost overlap region 32. Cooperating with the pocket-top flap 30 in the overlap region 32 is the pocket bottom flap 38 which is integrally connected to front flap 17 and which extends a distance below longitudinal seal 24, i.e. about 15 mm. Flaps 30 and 38 in overlap region 32 are in the locked position. This can be seen more clearly in FIG. 4 which is a vertical cross section cut through that portion of the page in FIG. 1 containing slide 12'. It is apparent from FIG. 4 that the slide 12' is securely held in pocket 28 by the interactive cooperation of flaps 32 and 38. Flap 38 rest firmly on the slide and flap 32 securely keeps flap 38 in place thereby ensuring that the dislodgement of the slide is virtually impossible.

FIG. 3 is a vertical cross-section cut through the holder page in FIG. 1 in the region of slide 12" which shows the strip-bottom flap 38 of front strip 19 overlapping the strip-top flap of front strip 18 which in turn overlaps the slide 12" in overlap region 34. Strip-bottom flap 38 functions to protect the contents of pocket 28 from dust and/or moisture.

FIG. 2 is a vertical cross section cut through the page 10 shown in FIG. 1 in the region of slide 12'''. The top strip flap 39, of front strip 21, and the strip-top flap 30 of the front strip 20 cooperate to form a funnel arrangement 42 to facilitate easy and rapid loading of slide 12''' in the direction shown by arrow 44.

Figure 5:
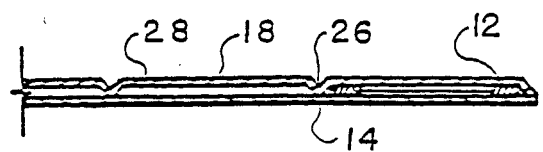
FIG. 5 is a horizontal cross-sectional view of the holder shown in FIG. 1, taken along the line V—V.

FIG. 5 is a horizontal cross-sectional view of the holder in FIG. 1 which shows the slide 12" in the pocket 24. The front strip 18 is also shown sealed to the backing sheet 14 at transverse seals 26.

Unloading is easily accomplished according to the inventive embodiment because the slide protrudes from the top of the pocket allowing for the easy grasping of the slide.

Either of the other two functional positions of the page can easily be arranged from the first because none of the transverse seals protrude into any of the overlap regions thus allowing for the free manipulation of the cooperating flaps by pivoting the portion of the page above the manipulated overlap region relative the portion below the region about a longitudinal axis inside the overlap region while easily avoiding any disruption of the flaps above or below the manipulated region.

As shown in the Figures, the preferred embodiment includes a binding region 46 with holders 48 therein to receive the rings of a ring binder in which the pages may be stored.

In another similar embodiment, the page may be of increased height to accommodate two spaced apart longitudinal seals for the insertion of a file hanger bar therebetween. Instead of or in addition to the hanger bar holes may be punched to allow for the insertion of rings or bars and the like.

While specific embodiments of the invention have been shown and described in detail to illustrate the application of the principles of the invention, it will be understood that the invention may be embodied otherwise without departing from such principles.

What is claimed is:

1. A holder for thin items comprising: a backing sheet having a length, and a width; a plurality of strips having a length, a width substantially equal to the width of said backing sheet, each of said strips having an upper edge and a lower edge, said strips being connected to said backing sheet along a longitudinal connection line running substantially parallel to each of said strip edges spaced from said lower edge a distance which is less than the distance said longitudinal connection line is spaced from said upper edge, and said strips each being connected to said backing sheet along a plurality of transverse connection lines running substantially transverse to said longitudinal connection line, each transverse connection line extending toward the upper edge of the corresponding strip from adjacent said longitudinal connection line of a corresponding strip and terminating at a location spaced from said upper edge of the corresponding strip, each of said plurality of strips being located along the length of said backing sheet, such that strips positioned between upper and lower adjacent strips have upper and lower overlapping portions, said upper overlapping portion being defined between the location of termination of said transverse connection lines and the upper edge of the corresponding strip, said lower overlapping portion being defined between the longitudinal connection of the corresponding strip and the lower edge of the corresponding strip, said lower overlapping portion being positionable to overlap said upper overlapping portion of an adjacent strip and said lower overlapping portion being positionable to underlap said upper overlapping portion of the adjacent strip.

2. A holder for thin items comprising: a backing sheet having a length, and a width; a plurality of strips having a length, a width substantially equal to the width of said backing sheet, each of said strips having an upper edge and a lower edge, said strips being connected to said backing sheet along a longitudinal connection line running substantially parallel to each of said strip edges spaced from said lower edge a distance which is less than the distance said longitudinal connection line is spaced from said upper edge, and said strips each being connected to said backing sheet along a plurality of transverse connection lines running substantially transverse to said longitudinal connection line, each transverse connection line extending toward the upper edge of the corresponding strip from adjacent said longitudinal connection line of a corresponding strip and terminating at a location spaced from said upper edge of the corresponding strip, each of said plurality of strips being located along the length of said backing sheet, such that strips positioned between upper and lower adjacent strips have upper and lower overlapping portions, said upper overlapping portion being defined between the location of termination of said transverse connection lines and the upper edge of the corresponding strip, said lower overlapping portion being defined between the longitudinal connection of the corresponding strip and the lower edge of the corresponding strip, said plurality of strips including an uppermost strip connected to said backing sheet by a longitudinal connection line and having a lower overlapping portion extending from said longitudinal connection line to said bottom edge of the uppermost strip.

* * * * *